United States Patent [19]

Trapp et al.

[11] Patent Number: 5,673,774

[45] Date of Patent: Oct. 7, 1997

[54] AUXILIARY VEHICLE CURRENT COLLECTOR

[75] Inventors: Scott M. Trapp, Simpsonville, S.C.; Michael A. Weiss, Stoney Creek, Canada

[73] Assignee: Westinghouse Air Brake Company, Wilmerding, Pa.

[21] Appl. No.: 506,691

[22] Filed: Jul. 25, 1995

[51] Int. Cl.$^6$ .................. B60L 5/38; B60L 5/12
[52] U.S. Cl. .................. 191/49; 191/64; 191/68
[58] Field of Search .................. 191/45 R, 48, 191/49, 53, 59.1, 64, 65, 66, 68, 69, 70, 60.5

[56] References Cited

U.S. PATENT DOCUMENTS

| | | | |
|---|---|---|---|
| 655,014 | 7/1900 | Rogers | 191/68 |
| 1,101,666 | 6/1914 | Santore | 191/59.1 X |
| 1,188,256 | 6/1916 | Dzwonka | 191/64 |
| 1,872,351 | 8/1932 | Schaake et al. | 191/53 X |
| 3,114,441 | 12/1963 | Springings | 191/69 |
| 3,123,191 | 3/1964 | Springings | 191/59.1 X |
| 3,740,498 | 6/1973 | Herbert | 191/49 |
| 4,042,081 | 8/1977 | Pier . | |
| 5,079,543 | 1/1992 | Pircher | 191/1 R X |

FOREIGN PATENT DOCUMENTS

| | | | |
|---|---|---|---|
| 1438828 | 4/1969 | Germany | 191/69 |
| 52-16711 | 2/1977 | Japan | 191/59.1 |

OTHER PUBLICATIONS

Pp. 210,211,212,213,214,215,220,221,222,223,230 and 231 of undated Ohio Brass Catalog.

Primary Examiner—Karen B. Merritt
Assistant Examiner—Scott L. Lowe
Attorney, Agent, or Firm—James Ray & Associates

[57] ABSTRACT

An energy collector allows flow of electrical energy between a vehicle and a rail of a railway track. The energy collector includes a vehicle mounting device for mounting the energy collector to such vehicle; a collector shoe for sliding electrical contact on such rail; and a lever arm having a first end and a second end. The energy collector also includes a bottom torsion unit connected to the collector shoe and connected to the second end of the lever arm. The bottom torsion unit is disposed so that the collector shoe is forcefully and generally aligned upon such rail even as the collector shoe encounters physical deviations along a surface of such rail. The energy collector further includes a top torsion unit connected to the vehicle mounting device and connected to the first end of the lever arm. The top torsion unit is disposed so that a generally downwardly oriented force is applied to and conveyed by the lever arm to and through the bottom torsion unit to the collector shoe so as to encourage contact between the collector shoe and such rail. The energy collector additionally includes a shunt engageable at an initial end to such vehicle and connected at a terminal end to the collector shoe. When a potential is applied across such vehicle and such rail, the energy collector permits electrical energy to flow from such vehicle through both the shunt and the collector shoe to such rail during both static and dynamic operation of such vehicle.

11 Claims, 6 Drawing Sheets

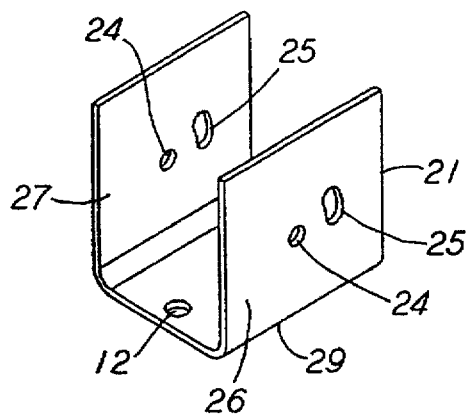
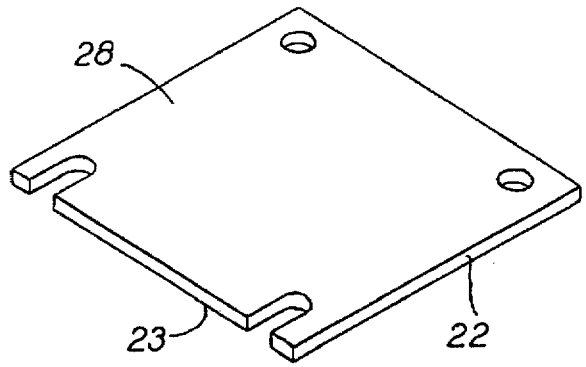
FIG. 5B
FIG. 5C
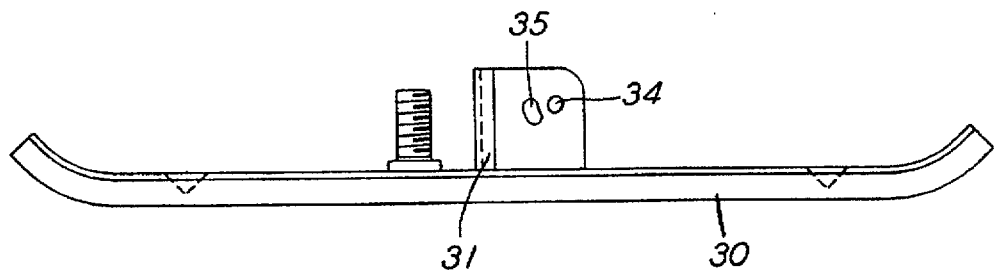
FIG. 6
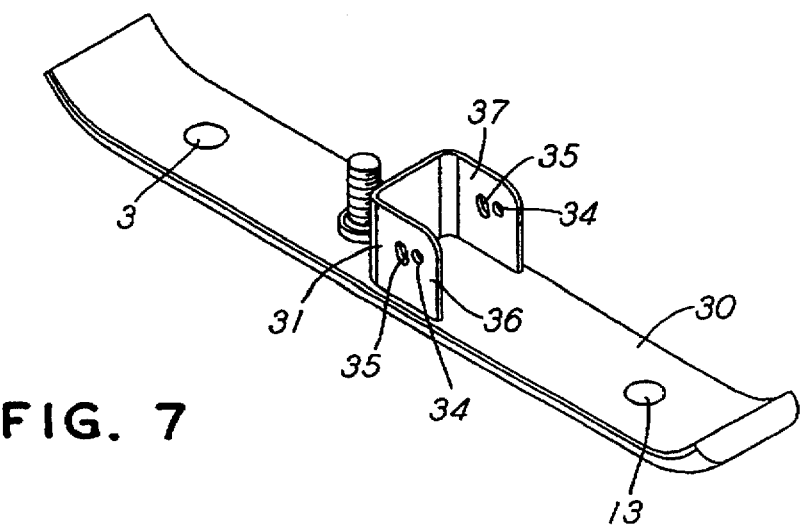
FIG. 7

AUXILIARY VEHICLE CURRENT COLLECTOR

FIELD OF THE INVENTION

The present invention generally relates to an apparatus which permits the transmission of electrical energy between a railway vehicle and a rail of a railway track. More particularly, the present invention pertains to an auxiliary railway vehicle current collector which provides a path for the transmission of electrical energy between an auxiliary railway vehicle and such rail of such railway track.

BACKGROUND OF THE INVENTION

As is generally well known in the current collector art, current collector devices are essentially conduits through which electrical energy or a path to ground is provided to a railway vehicle for operation along a railway track. Such current collector devices are used in a wide variety of transportation applications. Examples of such applications include subway trains, elevated trains, street cars (tram or trolley) and other mass or freight transit systems. Other examples of railway transport systems include railroad trains and, especially pertinent to the instant invention, auxiliary vehicles.

Subway cars, elevated railway cars, street cars and the like typically have steel railcar wheels and are used to transport people and/or freight on steel rails. Auxiliary vehicles, also referred to as service vehicles, basically serve as repair vehicles and are not used to transport people or freight. When a passenger or freight transit vehicle is in need of repair away from a repair yard, an auxiliary vehicle equipped with spare parts is sent to assist.

Auxiliary vehicles typically have both rubber wheels and steel wheels. The rubber wheels, driven by an engine and associated drive train, ride along a top surface of such rails of such railway track and serve to propel the auxiliary vehicle along such railway track. Though propelled by rubber wheels, the typical auxiliary vehicle actually rides on railcar wheels on such railway track.

Current collector devices come in a variety of types and can be used to connect such railway vehicle to an energy supply or to an energy return (i.e., an electrical ground). For example, some pick up the electrical energy (or the ground path) needed for propulsion from overhead catenaries. Others pick up the power from either two or three track railway track systems with the outside or third rail carrying the electrical energy. The former (or overhead catenary pickup) type is not applicable to the instant invention.

A typical current collector device has a collector shoe for riding on a surface of such rail of such railway track; a collector mount to which the collector shoe affixes; a torsion unit contained within the collector mount for applying a force to maintain contact between the collector shoe and such rail; a mounting bracket to which the collector mount attaches for mounting the device to such vehicle; and a shunt for carrying electrical energy between the collector shoe and such vehicle. The typical current collector may also have a wear indicator incorporated into the collector shoe so that the condition of the collector shoe may be quickly ascertained.

When connected between such rail and such vehicle, the current collector device essentially forms part of an electrical circuit. It can be disposed on both or either an energy supply side or an energy return side of the electrical circuit. For example, a source current collector device can be connected in series between an energy source rail of such railway track and a power feed circuitry of such vehicle. Likewise, a ground current (or negative return) collector device can be connected in series between a ground circuitry of such vehicle and a ground rail of such track.

When disposed within an energy supply side circuit, the typical current collector device usually includes a fuse located between the shunt and such vehicle. The fuse serves to protect electrical circuitry within such vehicle against short circuit currents.

Disposed on the energy supply side of such electrical circuit, the source collector device collects electrical energy from such source rail. The electrical energy flows through the collector shoe, the collector mount, the shunt and the fuse through and to such power feed circuitry of such vehicle thereby providing power to power consuming devices on such vehicle. Likewise, the collector shoe of the ground collector device allows electrical energy to flow from such ground circuitry of such vehicle through the fuse (if any), the shunt, and the collector mount through and to the collector shoe to such ground rail.

Typical current collector devices weigh anywhere from 20 to 90 pounds and carry currents ranging from 700 to 1000 amperes at operating voltages from 500 to 1000 volts dc. These devices operate within such parameters at speeds ranging approximately from 0 to 90 miles per hour. The pressure with which the typical collector shoe contacts such rail ranges approximately from 17 to 22 pounds.

Whereas typical current collector devices are used with subway trains, elevated rail cars, trolley cars and like railway transport systems, the present invention is primarily intended for use with the above mentioned auxiliary railway vehicles which operate at lower current and voltage levels. Therefore, unlike prior art current collectors, the instant invention will generally carry current levels ranging approximately from 90 to 160 amperes at operating voltages from 0 to approximately 800 volts dc.

Through a unique dual torsion unit arrangement, the present invention adjustably controls excessive pitch, yaw, and roll of the collector shoe upon and generally about such rail. The dual torsion unit arrangement imparts a generally downwardly oriented force to the collector shoe thereby encouraging continuous contact between the collector shoe and such rail during both static and dynamic operation of such vehicle. The collector shoe of the present invention thus remains in contact with such rail even while traveling over trip mechanisms placed on, or other physical deviations found along, such surface of such railway track. The contact force between the collector shoe and such rail can be increased or decreased depending on how the dual torsion unit arrangement is adjusted.

As auxiliary vehicles typically travel at speeds lower than railway transit systems, the instant energy collector will slide along such rail at speeds generally ranging from 0 to 50 miles per hour. Therefore, in comparison to typical current collector devices, friction between the collector shoe of the instant invention and such rail is less pronounced. Through the dual torsion unit arrangement, the contact force can be adjusted to reduce friction even further between the instant collector shoe and such rail. The instant collector shoe will thus exhibit less wear than collector shoes of typical current collector devices.

The instant auxiliary vehicle energy collector can be used within new railway vehicle designs or incorporated within existing railway vehicles. Not only is the present invention easily installed on such new and existing railway vehicles but it is also easily adjusted thereafter. The subject energy collector moreover requires relatively little or no maintenance as compared to energy collectors disclosed in prior art.

It should be apparent to persons skilled in the current collector art that the present invention could also be used with the aforementioned railway transport systems in addition to auxiliary railway vehicles, though obvious modifications may be necessary in some systems.

SUMMARY OF THE INVENTION

In a first aspect and presently preferred embodiment, the present invention provides an energy collector which allows flow of electrical energy between a vehicle and a rail of a railway track. The energy collector includes a vehicle mounting device for mounting the energy collector to such vehicle; a collector shoe for sliding electrical contact on such rail of such railway track; and a lever arm having a first end and a second end. The energy collector also includes a bottom torsion unit connected to the collector shoe and connected to the second end of the lever arm. The bottom torsion unit is disposed so that the collector shoe is forcefully and generally aligned upon such rail even as the collector shoe encounters physical deviations along a surface of such rail. The energy collector further includes a top torsion unit connected to the vehicle mounting device and connected to the first end of the lever arm. The top torsion unit is disposed so that a generally downwardly oriented force is applied to and conveyed by the lever arm to and through the bottom torsion unit to the collector shoe so as to encourage substantial contact between the collector shoe and such rail. The energy collector additionally includes a shunt connected at an initial end to such vehicle and at a terminal end to the collector shoe. When a potential is applied across such vehicle and such rail, the energy collector permits electrical energy to flow from such vehicle through both the shunt and the collector shoe to such rail during both static and dynamic operation of such vehicle.

In second aspect, the present invention provides an energy collector which allows flow of electrical energy between a vehicle and a rail of a railway track. The energy collector comprises a vehicle mounting device for mounting the energy collector to such vehicle; a collector shoe for sliding electrical contact on such rail of such railway track; a dual torsion operational means connected between the vehicle mounting device and the collector shoe; and a shunt for conducting such electrical energy. The dual torsion operational means controls force directed upon and a position of the collector shoe on such rail. The shunt connects at an initial end to such vehicle and at a terminal end to the collector shoe. When a potential is applied across such vehicle and such rail, the energy collector permits electrical energy to flow from such vehicle through both the shunt and the collector shoe to such rail during both static and dynamic operation of such vehicle.

OBJECTIVE OF THE INVENTION

A primary objective of the present invention is to provide an auxiliary railway vehicle energy collector which provides a path for the transmission of electrical energy between an auxiliary railway vehicle and a rail of a railway track.

Another objective of the present invention is to provide an auxiliary railway vehicle energy collector which is easy to install on an auxiliary railway vehicle and, once installed, easy to adjust thereafter.

Yet another objective of the present invention is to provide an auxiliary railway vehicle energy collector which requires relatively little or no maintenance as compared to energy collectors disclosed in prior art.

Still another objective of the present invention is to provide an auxiliary railway vehicle energy collector including a collector shoe which exhibits minimal wear due to friction generated as the collector shoe rides on a surface of a rail of a railway track.

Even another objective of the present invention is to provide an auxiliary railway vehicle energy collector including a collector shoe for riding on a rail of a railway track wherein the collector shoe has wear mark indicators which permit easy and quick inspection of the collector shoe for signs of wear.

A further objective of the present invention is to provide an auxiliary railway vehicle energy collector including a collector shoe for riding on a rail of a railway track and an adjustable top torsion unit which applies a force upon the collector shoe to encourage constant contact between the collector shoe and such rail.

Yet a further objective of the present invention is to provide an auxiliary railway vehicle energy collector including a collector shoe for riding on a rail of a railway track and an adjustable bottom torsion unit which controls excessive pitch, yaw, and roll of the collector shoe upon such rail and through which the collector shoe is forcefully and generally aligned upon such rail even as the collector shoe encounters physical deviations along a surface of such rail.

Still a further objective of the present invention is to provide an auxiliary railway vehicle energy collector including a vehicle mounting device, a collector shoe and a dual torsion operational means connected therebetween wherein the dual torsion operational means encourages constant contact between the collector shoe and a rail of a railway track and controls excessive pitch, yaw, and roll of the collector shoe upon such rail.

Even a further objective of the present invention is to provide an auxiliary railway vehicle energy collector including a vehicle mounting device and a collector shoe wherein a distance therebetween is adjustable.

In addition to the various objectives and advantages of the present invention described above, various other objectives and advantages of the present invention will become more readily apparent to those persons who are skilled in the vehicle energy collector art from the detailed description of the invention, particularly, when such description is taken in conjunction with the attached drawings and the appended claims.

BRIEF DESCRIPTION OF THE DRAWINGS

FIG. 5b is an elevational perspective view of a vehicle mounting bracket according to present invention.

FIG. 5c is an elevational perspective view of a vehicle mounting plate according to present invention.

FIG. 6 is a side view of a collector shoe illustrating a collector shoe housing according to the present invention.

FIG. 7 is an elevational perspective view of a collector shoe illustrating a collector shoe housing according to the present invention.

DETAILED DESCRIPTION OF THE INVENTION

Figure 1:
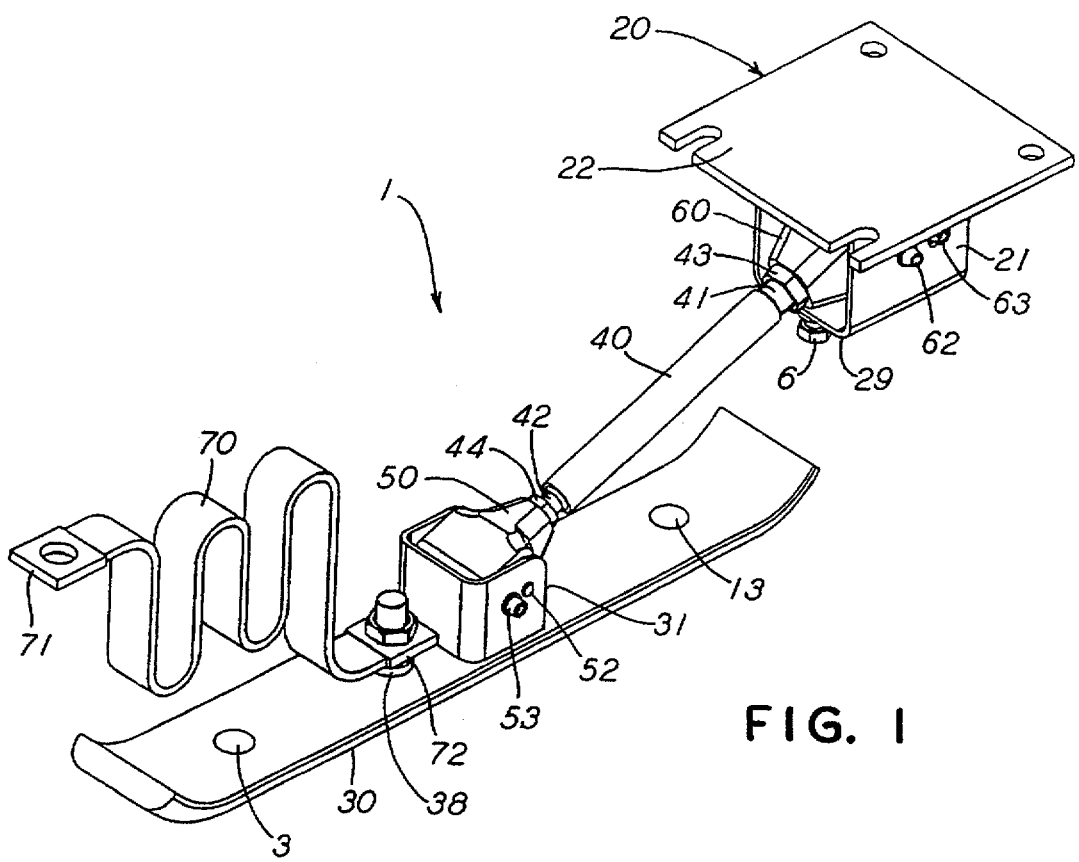
FIG. 1 is an elevational perspective view of a vehicle current collector according to the present invention.

Prior to proceeding to a more detailed description of various aspects of the present invention, for the sake of clarity and understanding, it should be noted that identical components having identical functions in each of the accompanying drawings have been identified with identical reference numerals throughout each of the several Figures illustrated herein.

Figure 2:
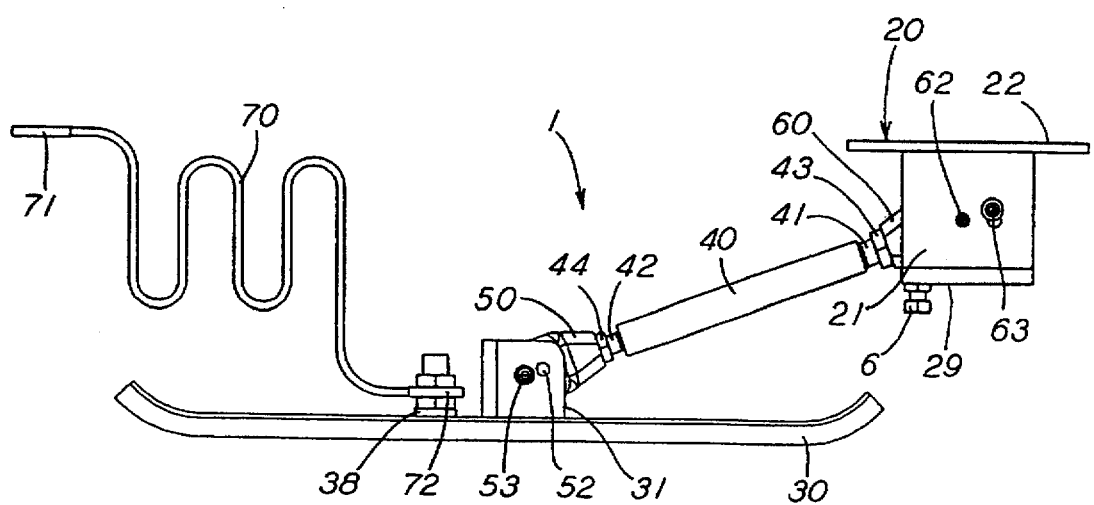
FIG. 2 is a side view of a vehicle current collector according to the present invention.

Referring to either FIG. 1 or FIG. 2, illustrated therein is the presently preferred embodiment of an auxiliary railway vehicle current collector, generally designated 1, which allows flow of electrical energy between a vehicle (not shown) and a rail (not shown) of a railway track (not shown).

In a first aspect, the railway vehicle current collector 1 basically includes a vehicle mount 20 for mounting the current collector to such vehicle; a collector shoe 30 for sliding electrical contact on such rail of such railway track; and a lever arm 40 having a first end 41 and a second end 42. The vehicle current collector 1 also includes a bottom torsion unit 50 and a top torsion unit 60.

The bottom torsion unit 50 is connected to the collector shoe 30 and is connected to the second end 42 of the lever arm 40. The bottom torsion unit 50 is disposed so that the collector shoe 30 is forcefully and generally aligned upon such rail. The bottom torsion unit 50 essentially applies a constant torsional force upon the collector shoe 30 thereby ensuring that the collector shoe 30 contacts such rail even as the collector shoe 30 encounters physical deviations along a surface of such rail as such vehicle moves along such railway track.

The top torsion unit 60 is connected to the vehicle mount 20 and is connected to the first end 41 of the lever arm 40. The top torsion unit 60 is disposed so that a generally downwardly oriented force is applied to and conveyed by the lever arm 40 to and through the bottom torsion unit 50 so as to encourage substantial contact between the collector shoe 30 and such rail.

The vehicle current collector 1 additionally includes a shunt 70 connected at an initial end 71 to such vehicle and at a terminal end 72 to the collector shoe 30 at a point 38. When a potential is applied across such vehicle and such rail, the vehicle current collector 1 permits electrical energy to flow from such vehicle through both the shunt 70 and the collector shoe 30 to such rail during both static and dynamic operation of such vehicle.

Figure 3:
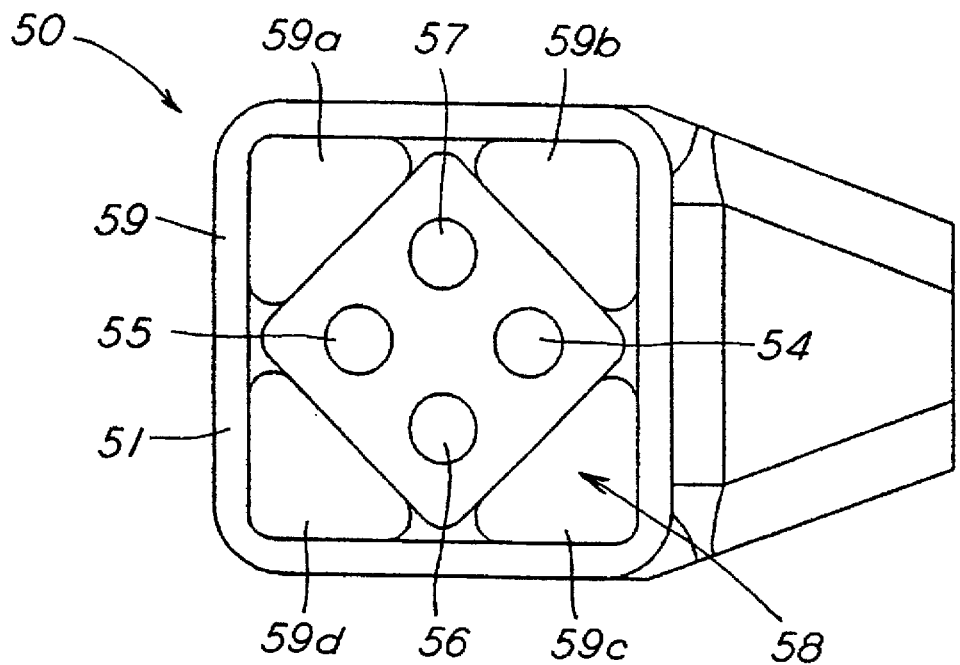
FIG. 3 is a side view of a bottom torsion unit according to present invention.

Still referring to FIGS. 1 and 2, the bottom torsion unit 50 is adjustable to control generally excessive pitch, yaw, and roll of the collector shoe 30 upon such rail. The bottom torsion unit 50, illustrated in FIG. 3, defines throughholes 54 through 57. A collector shoe housing 31 of collector shoe 30, as shown in FIGS. 1, 2, 6 and 7, defines a throughhole pair 34 and a kidney shaped throughhole pair 35, as shown in FIGS. 6 and 7. The bottom torsion unit 50 fits within the collector shoe housing 31 so as to align the throughhole 54 of the bottom torsion unit 50 with the throughhole pair 34 of the collector shoe housing 31. A bottom retaining means 52 such as a bolt and nut combination inserts therethrough and, when tightened, secures the bottom torsion unit 50 within the collector shoe housing 31.

In conjunction with the bottom retaining means 52, a leveling force adjusting means 53 permits the bottom torsion unit 50 to align generally and forcefully the collector shoe 30 upon such rail. Similar to the bottom retaining means 52, the leveling force adjusting means 53 inserts through both the throughhole 55 of the bottom torsion unit 50 and the kidney shaped throughhole pair 35 of the collector shoe housing 31. When tightened, the leveling force adjusting means 53 serves in part to secure the bottom torsion unit 50 within the collector shoe housing 31.

The leveling force adjusting means 53 and the bottom retaining means 52 also serve to impart a rotational force within the bottom torsion unit 50 which the bottom torsion unit 50 uses to apply a constant, generally downward force upon the collector shoe 30. With the bottom torsion unit 50 initially positioned within the collector shoe housing 31 so that the throughhole 54 and the throughhole pair 34 are aligned and a longitudinal axis of the bottom torsion unit 50 is situated parallel to a longitudinal axis of the collector shoe 30, the bottom retaining means 52 is inserted therethrough and tightened thereby securing the bottom torsion unit 50 within the collector shoe housing 31. At this point, a bottom loadable medium, generally designated 58, contained within the bottom torsion unit 50 is clamped between two plates 36,37 of the collector shoe housing 31. As the bottom torsion unit 50 is rotated upwardly to align the throughhole 55 with the throughhole pair 35, the rotational force is generated within the bottom loadable medium 58. The leveling force adjusting means 53 is then inserted therethrough and tightened thereabout thereby storing the rotational force within the bottom torsion unit 50. It is worthy to note that the amount of the rotational force imparted to the bottom torsion unit 50 is adjustable within the confines of the kidney shaped throughhole pair 35.

When the vehicle current collector 1 is installed on such vehicle, the leveling force adjusting means 53 is loosened at which point the bottom loadable medium 58 essentially releases the rotational force stored therein which obliges the bottom torsion unit 50 to apply the generally downward force upon the collector shoe 30. The leveling force adjusting means 53 is then again tightened thereby aiding the bottom retaining means 52 in securing the bottom torsion unit 50 within the collector shoe housing 31. The collector shoe housing 31 in combination with the bottom retaining means 52 and the leveling force adjusting means 53 thus enable the bottom torsion unit 50 to apply forcefully the collector shoe 30 against such rail.

It should be noted that the amount of rotational force imparted to the bottom torsion unit 50 also depends upon the materials which comprise the bottom loadable medium 58 and the extent to which the bottom torsion unit 50 is rotated after the bottom retaining means 52 is tightened. For example, if the bottom torsion unit 50 is rotated upwardly beyond alignment of the throughhole 55 with the throughhole pair 35 to the point where the throughhole 57 aligns therewith and the leveling force adjusting means 53 is inserted therethrough, the rotational force stored within the bottom loadable medium 58 is even greater. Though now greater, the rotational force imparted to the bottom torsion unit 50 is still adjustable within the confines of the kidney shaped throughhole pair 35. For the purposes of the instant invention, however, rotation of the bottom torsion unit 50 beyond alignment of the throughhole 55 and the throughhole pair 35 is not contemplated.

Figure 4:
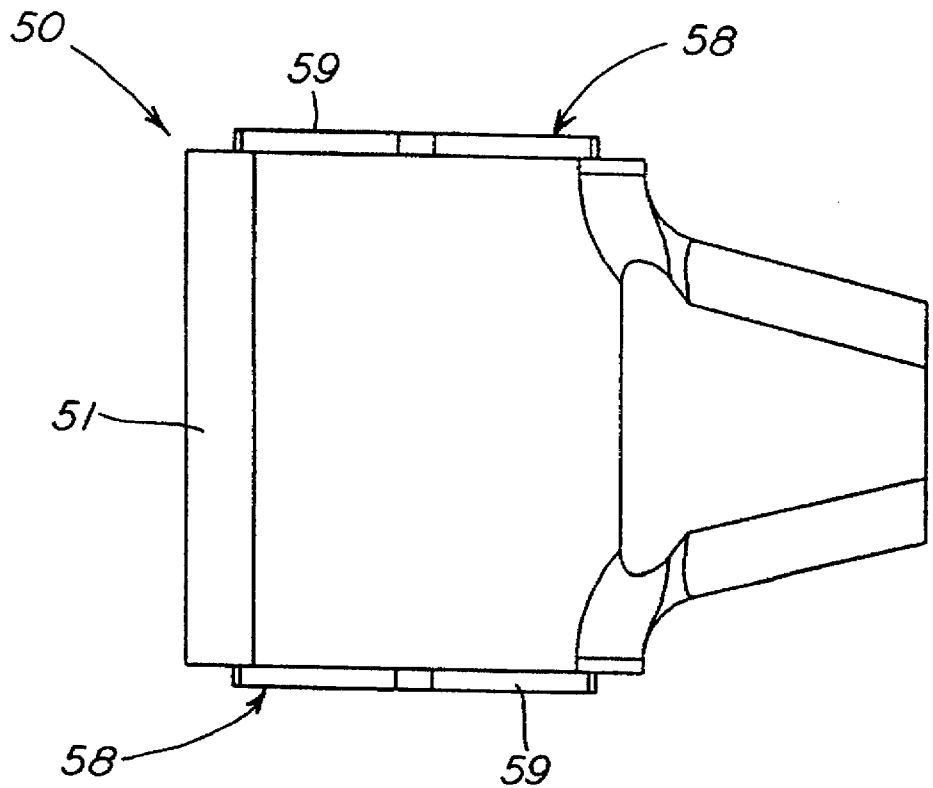
FIG. 4 is a top view of a bottom torsion unit according to present invention.

The bottom loadable medium 58 of the bottom torsion unit 50 may take any one of several forms. For example, in the presently preferred embodiment, the bottom torsion unit 50 could be a Rosta brand torsion unit, a type well known in the torsion unit art. Illustrated in FIGS. 3 and 4, the bottom torsion unit 50 includes a bottom torsion unit housing 51 and the bottom loadable medium 58. The bottom loadable medium 58 includes an aluminum extrusion 59 and rubber inserts 59a–d. The aluminum extrusion 59 is generally rectanguloid in shape having a length that is slightly longer than the width of the bottom torsion unit housing 51. (This allows the bottom loadable medium 58 to be clamped between the two plates 36,37 of the collector shoe housing 31 through bottom retaining means 52 and yet still allow the bottom torsion unit 50 to rotate generally about the bottom loadable medium 58 for loading and adjustment purposes.) Each of the rubber inserts 59a–d, of a length generally less than or equal to the width of the bottom torsion unit housing 51, is longitudinally aligned along and placed adjacent to one of four sides of the aluminum extrusion 59. The aluminum extrusion 59 along with the rubber inserts 59a–d so placed are then forcefully inserted into the bottom torsion unit housing 51 where they fit snugly. Therefore, as the bottom torsion unit. 50, secured by the bottom retaining means 52, is rotated upwardly to align the throughhole 55 with the throughhole pair 35, the rotational force as described above is ultimately stored within the rubber inserts 59a–d.

Moreover, through the rubber inserts 59a–d, the aluminum extrusion 59, the bottom retaining means 52 and the leveling force adjusting means 53, the bottom torsion unit 50 generally controls at least one of pitch, yaw, and roll of the collector shoe 30. Pitch could be visualized in FIG. 2 as an oscillation or partial rotation of the collector shoe 30 about the bottom torsion unit 50 generally, and, more specifically, about a bottom pitch axis projecting out of the plane of the drawing and generally aligned with and parallel to the bottom retaining and the leveling force adjustment means 52,53. In applying the above described generally downward force upon the collector shoe 30, the bottom torsion unit 50 forces the collector shoe 30 upon such rail and therein generally controls the pitch of the collector shoe 30 about the bottom pitch axis.

Yaw could be visualized in FIG. 2 as a slight oscillation or rotation of the collector shoe 30 about the bottom torsion unit 50 generally, and, more specifically, about a bottom yaw axis vertically disposed within the plane of the drawing and perpendicular to and generally intersecting the bottom pitch axis. Roll could be similarly visualized in FIG. 2 as a minor oscillation of the collector shoe 30 about the bottom torsion unit 50 generally, and, more specifically, about a bottom roll axis horizontally disposed within the plane of the drawing and perpendicular to and generally intersecting the bottom pitch axis.

The bottom torsion unit 50 thus controls and/or limits yaw and roll of the collector shoe 30 through a variety of ways. The bottom retaining means 52 and the leveling force adjusting means 53 each strongly discourage oscillation of the collector shoe 30 about the yaw and the roll axes. The rubber inserts 59a–d serve to dampen any tendency toward oscillation about the yaw and the roll axes. Perhaps to a lesser extent, the above described generally downward force upon the collector shoe 30 also serves to control the yaw and roll of the collector shoe 30.

It should be apparent to persons skilled in the vehicle energy collector art that excessive pitch, yaw, and roll of the collector shoe 30 is controlled and/or limited to a certain extent through means other than those described above. In particular, the shunt 70 and the top torsion unit 50, as described below, provide even further stability to the collector shoe 30.

Referring again to FIGS. 1 and 2, the top torsion unit 60 is adjustable to control the above mentioned downwardly oriented force applied to and conveyed by the lever arm 40 to and through the bottom torsion unit 50 to the collector shoe 30. The vehicle mount 20, into which the top torsion unit 60 fits, includes a vehicle mounting bracket 21 and a vehicle mounting plate 22, as illustrated in FIGS. 5b and 5c, respectively. An open side of the mounting bracket 21 attaches to an underside 23 of the mounting plate 22. With the mounting bracket 21 and the mounting plate 22 so assembled, the vehicle mount 20 connects to such vehicle so that when the top torsion unit 60 is connected thereto the collector shoe 30 is generally well aligned longitudinally with such rail.

It should be noted that either the vehicle mount 20 as specifically described herein or, more generally, a mounting means encompassing a wide variety of vehicle mounting devices may be employed to mount the current collector to such vehicle.

Figure 5:
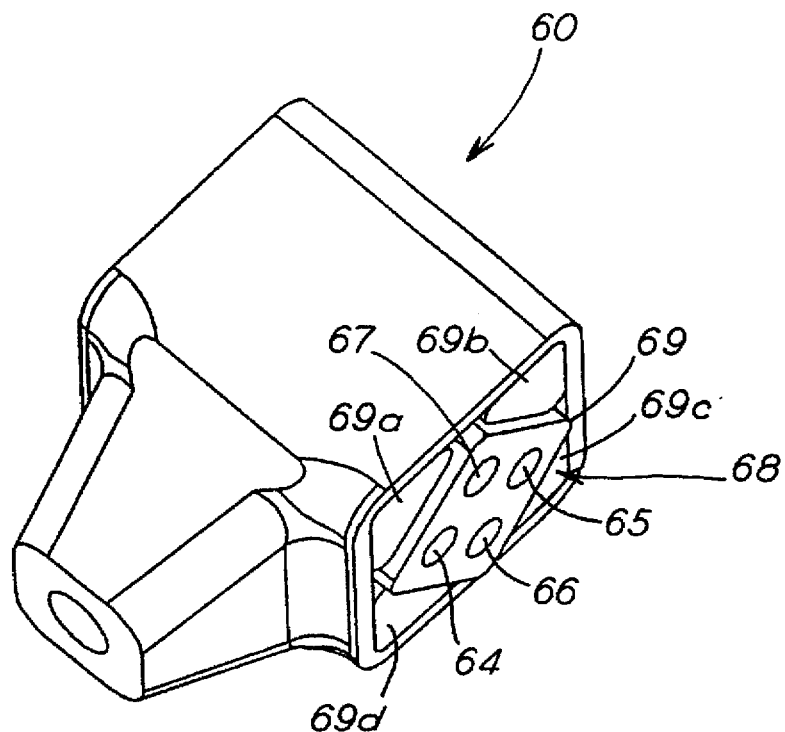
FIG. 5 is an elevational perspective view of a top torsion unit according to present invention.
Figure 5A:
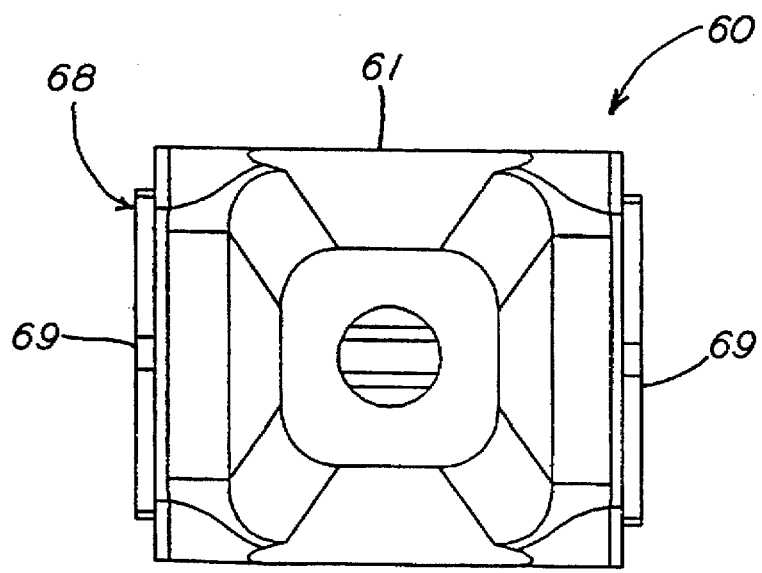
FIG. 5a is a front view of a top torsion unit according to present invention.
Figure 8:
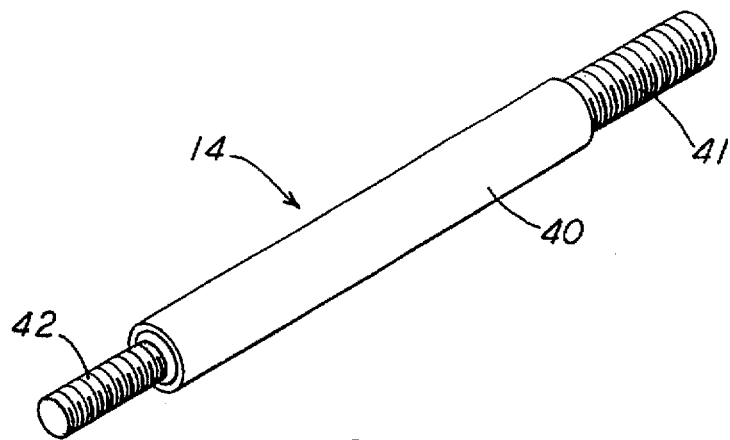
FIG. 8 is an elevational perspective view of a lever arm according to the present invention.
Figure 9:
FIG. 9 is a side view of a lever arm according to the present invention.

The top torsion unit 60, illustrated in FIGS. 5 and 5a, defines throughholes 64 through 67. The vehicle mounting bracket 21, as shown in FIGS. 1, 2, and 5b, defines a throughhole pair 24 and a kidney shaped throughhole pair 25, as best illustrated in FIG. 5b. The top torsion unit 60 fits within the vehicle mounting bracket 21 so as to align the throughhole 64 of the top torsion unit 60 with the throughhole pair 24 of the vehicle mounting bracket 21. A top retaining means 62 such as a bolt and nut combination inserts therethrough and, when tightened, secures the top torsion unit 60 within the vehicle mount 20.

In conjunction with the top retaining means 62, a contacting force adjusting means 63 permits the top torsion unit 60 to apply the generally downward oriented force to, ultimately, the collector shoe 30. Similar to the top retaining means 62, the contacting force adjusting means 63 inserts through both the throughhole 65 of the top torsion unit 60 and the kidney shaped throughhole pair 25 of the vehicle mounting bracket 21. When tightened, the contacting force adjusting means 63 serves in part to secure the top torsion unit 60 within the vehicle mount 20.

The contacting force adjusting means 63 and the top retaining means 62 also serve to impart a rotational force within the top torsion unit 60 which the top torsion unit 60 uses to apply the generally downward oriented force to, ultimately, the collector shoe 30. With the top torsion unit 60 initially positioned within the vehicle mount 20 so that the throughhole 64 and the throughhole pair 24 are aligned and a longitudinal axis of the top torsion unit 60 is situated substantially below parallel with a longitudinal axis of the collector shoe 30, the top retaining means 62 is inserted therethrough and tightened thereby securing the top torsion unit 60 within the vehicle mount 20. At this point, a top loadable medium, generally designated 68, contained within the top torsion unit 60 is clamped between two plates 26,27 of the mounting bracket 21. As the top torsion unit 60 is rotated upwardly to align the throughhole 65 with the throughhole pair 25, the rotational force is generated within the top loadable medium 68. The contacting force adjusting means 63 is then inserted therethrough and tightened thereabout thereby storing the rotational force within the top torsion unit 60. It is worthy to note that the amount of the rotational force imparted to the top torsion unit 50 is adjustable within the confines of the kidney shaped throughhole pair 25.

With the vehicle current collector 1 installed on such vehicle, the contacting force adjusting means 63 is loosened at which point the top loadable medium 68 essentially releases the rotational force stored therein. This compels the lever arm 40 to rotate along with the top torsion unit 60. The top torsion unit 60, however, is linked in series with the lever arm 40, the bottom torsion unit 50 and the collector shoe 30. Because of this linkage and the collector shoe 30 being situated on such rail, the rotational force translates into the generally downward oriented force which pushes the collector shoe 30 into substantial contact with such rail.

With the collector shoe 30 so placed in contact with such rail, the contacting force adjusting means 63 is then again tightened. This aids the top retaining means 62 in securing the top torsion unit 60 within the vehicle mount 20. The vehicle mount 20 in combination with the top retaining means 62 and the contacting force adjusting means 63 thus enable the top torsion unit 60 to generate the generally downward oriented force that compels the collector shoe 30 against such rail.

It should be noted that the amount of rotational force imparted to the top torsion unit 60 also depends upon the materials which comprise the top loadable medium 68 and the extent to which the top torsion unit 60 is rotated after the top retaining means 62 is tightened. For example, if the top torsion unit 60 is rotated upwardly beyond alignment of the throughhole 65 with the throughhole pair 25 to the point where the throughhole 67 aligns therewith and the contacting force adjusting means 63 is inserted therethrough, the rotational force stored within the top loadable medium 68 is even greater. Though now greater, the rotational force imparted to the top torsion unit 60 is still adjustable within the confines of the kidney shaped throughhole pair 25. For the purposes of the instant invention, however, rotation of the top torsion unit 60 beyond alignment of the throughhole 65 and the throughhole pair 25 is not contemplated.

As with the bottom torsion unit 50, the top loadable medium 68 of the top torsion unit 60 may take any one of several forms. For example, in the presently preferred embodiment, the top torsion unit 60 could be a Rosta brand torsion unit, a type well known in the torsion unit art. Illustrated in FIGS. 5 and 5a, the top torsion unit 50 includes a top torsion unit housing 61 and the top loadable medium 68. The top loadable medium 68 includes an aluminum extrusion 69 and rubber inserts 69a–d. The aluminum extrusion 59 is generally rectanguloid in shape having a length that is slightly longer than the width of the top torsion unit housing 61. (This allows the top loadable medium 68 to be clamped between the two plates 26,27 of the mounting bracket 21 through the top retaining means 62 and yet still allow the top torsion unit 60 to rotate generally about the top loadable medium 68 for loading and adjustment purposes.) Each of the rubber inserts 69a–d, of a length generally less than or equal to the width of the top torsion unit housing 61, is longitudinally aligned along and placed adjacent to one of four sides of the aluminum extrusion 69. The aluminum extrusion 69 along with the rubber inserts 69a–d so placed are then forcefully inserted into the top torsion unit housing 61 where they fit snugly. Therefore, as the top torsion unit 60, secured by the top retaining means 62, is rotated upwardly to align the throughhole 65 with the throughhole pair 25, the rotational force as described above is ultimately stored within the rubber inserts 69a–d.

Moreover, through the rubber inserts 69a–d, the aluminum extrusion 69, the top retaining means 62 and the contacting force adjusting means 63, the top torsion unit 60 assists to a certain degree the bottom torsion unit 50 in controlling at least one of pitch, yaw, and roll of the collector shoe 30. In applying the generally downward oriented force through the lever arm 40, the bottom torsion unit 50 and the collector shoe 30, the top torsion unit 60 compels the collector shoe 30 against such rail. This aids the bottom torsion unit 50 in controlling the pitch of the collector shoe 30 about the bottom pitch axis.

The top torsion unit 60 also tends to limit yaw and roll of the collector shoe 30. The top retaining means 62 and the contacting force adjusting means 63 each tend to discourage oscillation of the collector shoe 30 about the bottom yaw and the bottom roll axes. The rubber inserts 69a–d also tend to dampen oscillation about the bottom yaw and the bottom roll axes. The shunt 70, connected between such vehicle and the point 38 on the collector shoe 30, provides even further stability to the collector shoe 30.

The vehicle current collector 1 also includes, as another feature, an adjustable stop 6 as depicted in FIGS. 1 and 2. As best illustrated in FIGS. 2 and 5b, the adjustable stop 6 screws or otherwise retainably inserts into a screwhole 12 defined by an underside 29 of the vehicle mounting bracket 21. The adjustable stop 6 prevents the top torsion unit 60 from rotating downwardly with respect to the vehicle mount 20 beyond a desired point of travel. Not only does the adjustable stop 6 assist in controlling an amount of the aforementioned downwardly oriented force ultimately applied to the collector shoe 30 but it also renders the vehicle current collector 1 operable with collector shoes of varying thicknesses. When screwed fully within the screwhole 12, the adjustable stop 6 may also be used to elevate the collector shoe 30 above such rail. This facilitates loading of such vehicle onto such tracks.

The collector shoe 30 also includes, as yet another feature of the present invention, wear mark indicators 3 and 13. As shown in FIGS. 1 and 7, the wear indicators 3 and 13 allow a railway employee to inspect quickly and easily for an unacceptable degree of wear exhibited by the collector shoe 30.

Figure 10:
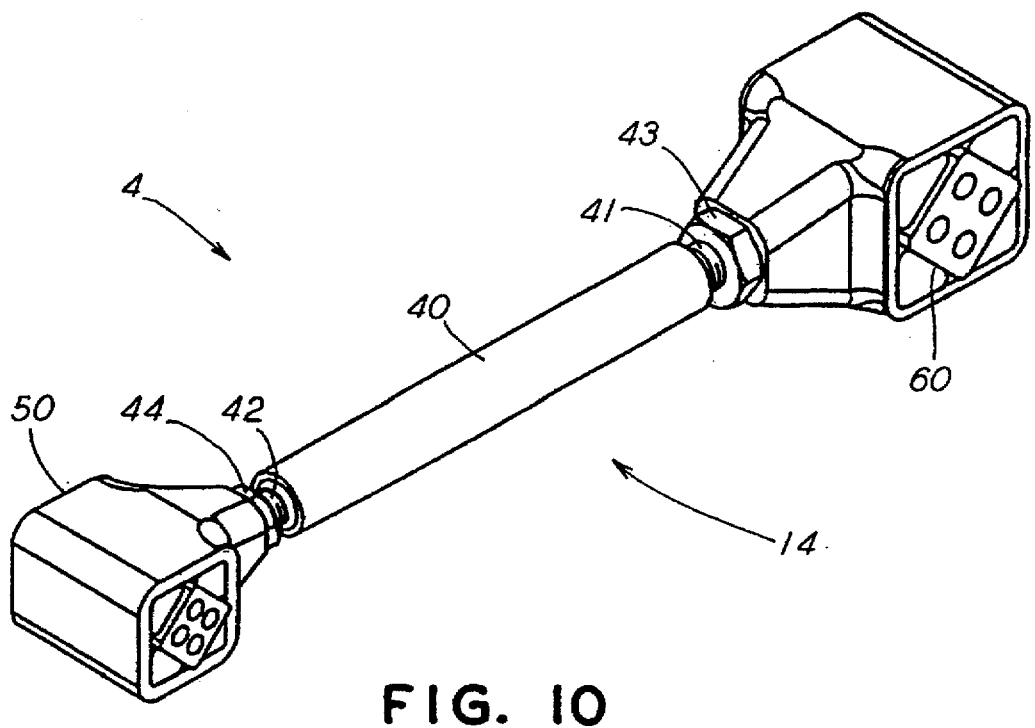
FIG. 10 is an elevational perspective view of a dual torsion operational means according to the present invention.
Figure 11:
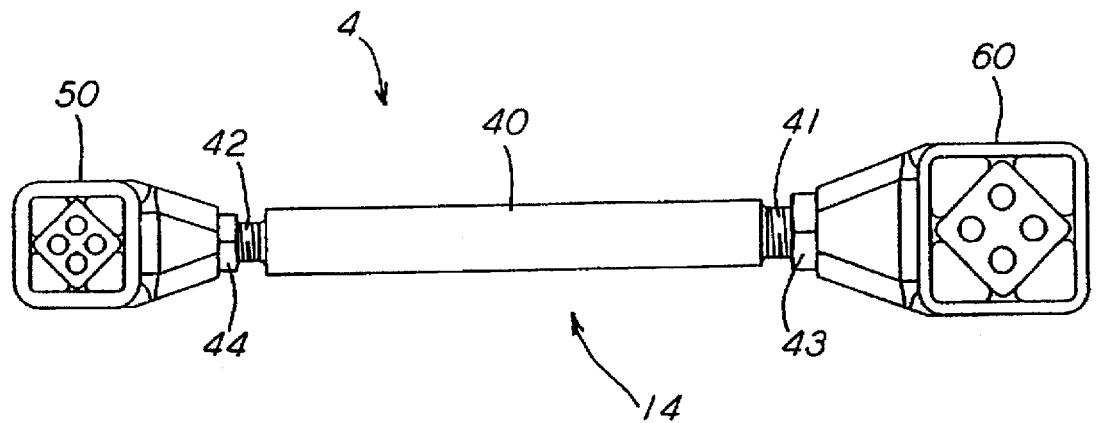
FIG. 11 is a side view of a dual torsion operational means according to the present invention.
Figure 12:
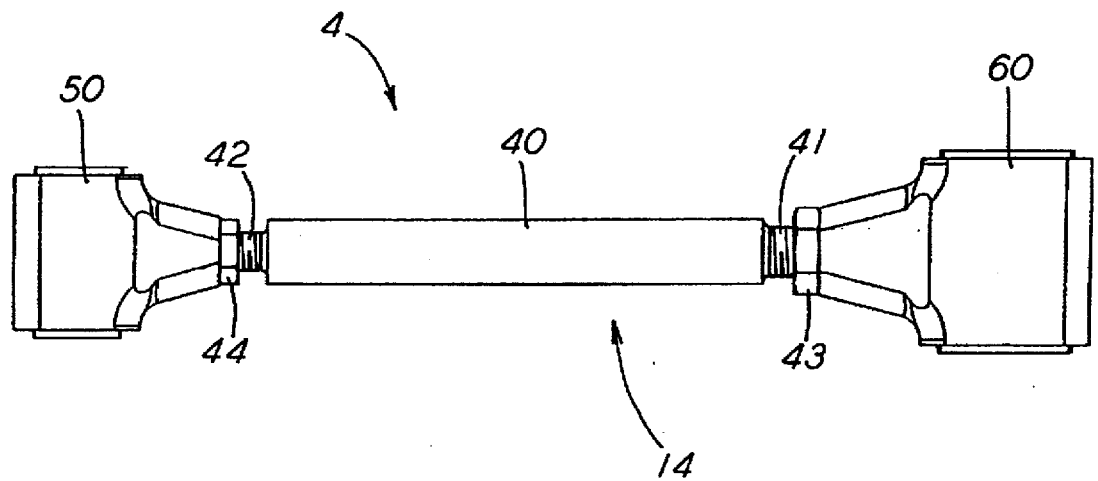
FIG. 12 is a top view of a dual torsion operational means according to the present invention.

Referring now to FIGS. 8 through 12, the railway vehicle current collector 1 also includes a means, generally designated 14, for adjusting a distance between the vehicle mount 20 and the collector shoe 30. The distance adjusting means 14 may be implemented as best illustrated in FIGS. 10 through 12.

The distance adjusting means 14 basically includes a first jam nut 43, a second jam nut 44, and the lever arm 40. The first end 41 of the lever arm 40 has right hand threading and the second end 42 has left hand threading (or vice versa). The first jam nut 43 is screwed completely onto the first end 41 leaving sufficient threading so that the first end 41 can be screwed into the top torsion unit 60. Likewise, the second jam nut 44 is screwed completely onto the second end 42 leaving sufficient threading so that the second end 42 can be screwed into the bottom torsion unit 50. By rotating the lever arm 40 in one direction, the first and the second ends 41,42 of the lever arm 40 screw into the top and the bottom torsion units 60,50 respectively. Each of the jam nuts 43,44 is then screwed fully towards, and is thereby locked against, its respective torsion unit 50,60.

The distance between the vehicle mount 20 and the collector shoe 30 is adjustable through the jam nuts 43,44 and the lever arm 40. When at least one of the jam nuts 43,44 is loosened, rotating the lever arm 40 in one direction decreases the distance therebetween. Rotating the lever arm 40 in the other direction increases the distance therebetween. When the jam nuts 43,44 are tightened against their respective torsion units 50,60, a selected length between the vehicle mount 20 and the collector shoe 30 is established.

It should be noted that the jam nuts 43,44 and the threading of both the first 41 and the second 42 ends of the lever arm 40 essentially comprise a means for connecting the bottom and the top torsion units 50,60. Other means for connecting the bottom and the top torsion units 50,60 should be equally apparent to those skilled in the energy collector and related arts. Likewise, other means for adjusting the distance between the vehicle mount 20 and the collector shoe 30 should be apparent to persons skilled in the energy collector art.

In a second aspect of the present invention, the railway vehicle current collector 1 basically includes the vehicle mount 20 for mounting the current collector to such vehicle; the collector shoe 30 for sliding electrical contact on such rail of such railway track; the shunt 70 connected at the initial end 71 to such vehicle and at the terminal end 72 to the point 38 of the collector shoe 30; and a dual torsion operational means connected between the vehicle mount 20 and the collector shoe 30.

Illustrated in FIGS. 10 through 12, the dual torsion operational means, generally designated 4, controls force directed upon and position of the collector shoe 30 on such rail during both static and dynamic operation of such vehicle. The dual torsion operational means 4 includes, and performs functions identical to, certain components set forth in the previous paragraphs including the bottom torsion unit 50; the top torsion unit 60; the lever arm 40; a means 14 for adjusting length of the dual torsion operational means between the vehicle mount 20 and the collector shoe 30; and the means for connecting the bottom and the top torsion units 50,60.

Accordingly, the dual torsion operational means 4 is adjustable to control generally excessive pitch, yaw, and roll of the collector shoe 30 even as the collector shoe 30 encounters physical deviations along the surface of such rail. Likewise, the dual torsion operational means 4 is adjustable to control the aforementioned downwardly oriented force applied by the dual torsion operational means 4 to the collector shoe 30.

The second aspect of the railway vehicle current collector 1 includes the adjustable stop 6 which prevents the dual torsional operational means 4 from rotating downwardly with respect to the vehicle mount 20 beyond the desired point of travel. Shown in FIGS. 1 and 2, the adjustable stop 6 not only assists in controlling the amount of the aforementioned downwardly oriented force ultimately applied to the collector shoe 30 but it also renders the vehicle current collector 1 operable with collector shoes of varying thicknesses. When screwed fully within the screwhole 12, the adjustable stop 6 may also be used to elevate the collector shoe 30 above such rail. This facilitates loading of such vehicle onto such tracks.

The second aspect of the railway vehicle current collector 1 also includes the wear mark indicators 3 and 13 on the collector shoe 30. As shown in FIGS. 1 and 7, the wear indicators 3 and 13 allow quick and easy inspection for an unacceptable degree of wear exhibited by the collector shoe 30.

It should be apparent to persons skilled in the vehicle energy collector art that the present invention herein described may be implemented so that the collector shoe 30 rides on either a top surface of such rail or a bottom surface of such rail.

Likewise, it should be apparent that if the shunt 70 is disposed on such energy supply side of the electrical circuit (i.e., connected in series between such energy source rail of such railway track and such power feed circuitry of such vehicle), the shunt 70 should be connected to such vehicle at a site electrically isolated from such vehicle mount 20. Conversely, if the shunt 70 is disposed on such energy return side of the electrical circuit (i.e., connected in series between such ground rail of such railway track and such ground circuitry of such vehicle), the shunt 70 may be connected to such vehicle mount 20 or even to such vehicle at a site isolated from such vehicle mount 20.

The second aspect of the railway vehicle current collector 1 further includes a fuse (not shown) connected in series within a circuit path defined between such vehicle and the collector shoe 30. The fuse is preferably contained with a fuse box (not shown). When used within such energy supply side circuit between such vehicle and such rail, the fuse protects circuitry of such vehicle against short circuit currents and arcing.

While the presently preferred embodiment and various aspects of the present invention have been set forth in detail in accordance with the Patent Act, those persons skilled in the energy collector art to which this invention pertains will recognize various alternative ways of practicing the invention without departing from the spirit and scope of the appended claims.

Accordingly, to promote the progress of science and useful arts, we secure for ourselves by Letters Patent exclusive rights to all subject matter embraced by the following claims for the time prescribed by the Patent Act.

We claim:

1. An energy collector which allows flow of electrical energy between a vehicle and a rail of a railway track, said energy collector comprises:

(a) a means for mounting said energy collector to such vehicle;

(b) a collector shoe for sliding electrical contact on such rail of such railway track;

(c) a lever arm having a first end threaded in one direction and a second end threading in a direction opposite to said one direction;

(d) a bottom torsion unit connected to both said collector shoe and said second end of said lever arm, said bottom torsion unit disposed so that said collector shoe is forcefully and generally aligned upon such rail even as said collector shoe encounters physical deviations along a surface of such rail, said bottom torsion unit being adjustable to control at least one of pitch, yaw and roll of said collector shoe;

(e) a top torsion unit connected to both said means for mounting and said first end of said lever arm, said top torsion unit disposed so that a generally downwardly oriented force is applied to and conveyed by said lever arm to and through said bottom torsion unit to said collector shoe so as to encourage contact between said collector shoe and such rail, said top torsion unit being adjustable to control said downwardly oriented force;

(f) a pair of jam nuts one of which screwable onto said first threaded end of said lever arm for locking said lever arm thereat to said top torsion unit and the other of which screwable onto said second threaded end of said lever arm for locking said lever arm thereat to said bottom torsion unit such that upon loosening at least one of said jam nuts and then rotating said lever arm, said distance between said means for mounting and said collector shoe is adjustable and upon tightening both of said jam nuts, a selected length between said means for mounting and said collector shoe is established; and (g) a shunt engageable at an initial end to such vehicle and connected at a terminal end to said collector shoe; such that upon application of a potential across such vehicle and such rail, said energy collector permits electrical energy to flow from such vehicle through both said shunt and said collector shoe to such rail during both static and dynamic operation of such vehicle.

2. The energy collector as recited in claim 1 wherein said energy collector further includes an adjustable stop to prevent said top torsion unit from rotating downwardly with respect to said means for mounting beyond a desired point of travel thereby controlling an amount of said downwardly oriented force ultimately applied to said collector shoe and allowing said energy collector to accommodate said collector shoe even if said collector shoe varies in thickness.

3. The energy collector as recited in claim 2 wherein said collector shoe includes wear mark indicators for quick and easy inspection of said collector shoe for wear.

4. The energy collector as recited in claim 1 wherein said top torsion unit is adjustably loaded and positioned within said means for mounting so that said top torsion unit imparts a rotational force upon said lever arm compelling said lever arm in a generally downward direction thereby imparting said downwardly oriented force to and through said bottom torsion unit to said collector shoe.

5. The energy collector as recited in claim 1 wherein said energy collector further includes an adjustable stop to prevent said top torsion unit from rotating downwardly with respect to said means for mounting beyond a desired point of travel thereby controlling an amount of said downwardly oriented force ultimately applied to said collector shoe and allowing said energy collector to accommodate said collector shoe even if said collector shoe varies in thickness.

6. The energy collector as recited in claim 5 wherein said collector shoe includes wear mark indicators for quick and easy inspection of said collector shoe for wear.

7. An energy collector which allows flow of electrical energy between a vehicle and a rail of a railway track, said energy collector comprises:

(a) a mounting mechanism to mount said energy collector to such vehicle;

(b) a collector shoe for sliding electrical contact on such rail of such railway track;

(c) a lever arm having a first threaded end and a second threaded end, said ends threaded in opposite directions;

(d) a bottom torsion unit connected to both said collector shoe and said second threaded end of said lever arm, said bottom torsion unit disposed so that said collector shoe is forcefully and generally aligned upon such rail even as said collector shoe encounters physical deviations along a surface of such rail, said bottom torsion unit being adjustable to control at least one of pitch, yaw and roll of said collector shoe;

(e) a top torsion unit connected to both said mounting mechanism and said first threaded end of said lever arm, said top torsion unit disposed so that a generally downwardly oriented force is applied to and conveyed by said lever arm to and through said bottom torsion unit to said collector shoe so as to encourage contact between said collector shoe and such rail, said top torsion unit being adjustable to control said downwardly oriented force;

(f) a pair of puts one of which screwable onto said first threaded end for locking said lever arm thereat to said top torsion unit and the other of which screwable onto said second threaded and for locking said lever arm thereat to said bottom torsion unit such that the distance between said mounting mechanism and said collector shoe is adjustable upon loosening said nuts and rotating said lever arm and a selected length between said mounting mechanism and said collector shoe is established upon tightening of said nuts; and (g) a shunt engageable at an initial end to such vehicle and connected at a terminal end to said collector shoe; such that upon application of a potential across such vehicle and such rail, said energy collector permits electrical energy to flow from such vehicle through both said shunt and said collector shoe to such rail during both static and dynamic operation of such vehicle.

8. The energy collector as recited in claim 7 wherein said top torsion unit is adjustably loaded and positioned within said mounting mechanism so that said top torsion unit imparts a rotational force upon said lever arm compelling said lever arm in a generally downward direction thereby imparting said downwardly oriented force to and through said bottom torsion unit to said collector shoe and rendering said top torsion unit adjustable to control said downwardly oriented force.

9. The energy collector as recited in claim 7 wherein said energy collector further includes an adjustable stop to prevent said top torsion unit from rotating downwardly with respect to said mounting mechanism beyond a desired point of travel thereby controlling an amount of said downwardly oriented force applied to said collector shoe and allowing said energy collector to accommodate said collector shoe even if said collector shoe varies in thickness.

10. The energy collector as recited in claim 9 wherein said collector shoe includes wear mark indicators for quick and easy inspection of said collector shoe for wear.

11. The energy collector as recited in claim 10 wherein said energy collector further includes a fuse connected in series within a circuit path defined between such vehicle and said collector shoe.

* * * * *